United States Patent [19]

Tesch

[11] Patent Number: 4,823,503

[45] Date of Patent: Apr. 25, 1989

[54] FISH HOOK POSITIONER AND RELEASE

[76] Inventor: Michael A. Tesch, 17001 Bataan St. NE., Ham Lake, Minn. 55304

[21] Appl. No.: 169,980

[22] Filed: Mar. 18, 1988

[51] Int. Cl.⁴ .............................................. A01K 83/00

[52] U.S. Cl. .................................... 43/42.04; 43/42.44

[58] Field of Search ................. 43/42.04, 42.41, 42.44, 43/42.1

[56] References Cited

U.S. PATENT DOCUMENTS

| | | | |
|---|---|---|---|
| 1,849,905 | 3/1932 | Braidwood | 43/42.04 |
| 2,429,339 | 10/1947 | Arbogast | 43/42.44 |
| 2,497,437 | 2/1950 | Slepica | 43/42.04 |
| 2,549,463 | 4/1951 | Hansen et al. | 43/42.04 |
| 2,746,200 | 5/1956 | Dale | 43/42.04 |
| 2,932,113 | 4/1960 | Dickens | 43/42.44 |
| 3,002,311 | 10/1961 | Kyper | 43/42.04 |
| 3,170,263 | 2/1965 | Purdy | 43/42.41 |
| 4,477,994 | 10/1984 | Erickson | 43/42.44 |

FOREIGN PATENT DOCUMENTS

| | | | |
|---|---|---|---|
| 751673 | 7/1956 | United Kingdom | 43/42.04 |

OTHER PUBLICATIONS

Field and Stream, Feb. 1957, p. 105, Katch King Lures ad.

*Primary Examiner*—Kurt Rowan

[57] ABSTRACT

A device used to increase the productivity of a solid body fishing lure by positioning the hook or hooks properly for optimum hook setting and then releasing the hook or hooks to pivot normally for optimum fish holding during the ensuing fight. Another benefit of the device is that it prevents damage to the lure caused by swinging hooks.

1 Claim, 1 Drawing Sheet

1
9
6
6
4
3
2
5
4
3
2
5

1
6
2
5
7

6
8
5
7

FISH HOOK POSITIONER AND RELEASE

BACKGROUND

1. Field of Invention

This invention relates generally to solid body artificial fishing lures and in particular to the way hooks are positioned on this type of lure.

2. Description of Prior Art

Many solid body artificial fishing lures exist which use a variety of hook types, sizes, and arrangements. The method of attachment and placement of the hooks may be for lure balance, to assist the action of the lure, to make the lure weedless, or possibly for other reasons. Since many fish are lost because of inadequate hooking qualities of solid body lures there exists a need to position the hook properly for the hook set (a hard jerk applied to the rod for the purpose of imbedding the hook into the mouth of the fish deeply enough so the barb will prevent the hook from coming out) while also allowing the hook to pivot with relation to the lure so the fish cannot get the leverage needed to throw the hook.

Hooks that are allowed to pivot freely from a solid body lure can damage the lure itself by chipping the finish and after extended use the hook points can even damage the body material. There exists a need to prevent this damage to the lure.

SUMMARY

This invention increases the percentage of fish caught per strike. At the same time it keeps the hooks from swinging around and damaging the lure. The hook is held in a position where the hook point is parallel or nearly parallel to the longitudinal axis of the lure and is thus pointing in the direction of the hook set when a fish strikes the lure. A hooked fish pulling directly opposite the direction the line is pulled will imbed the hook more deeply in its mouth. If, through leverage against the lure, the fish exerts force in a direction other than opposite the line pull, the positioner will release the hook and allow it to pivot freely thereby making it harder for the fish to disengage itself from the hook.

BRIEF DESCRIPTION OF THE DRAWINGS

Like numbers indicate like parts in all drawings.

DESCRIPTION OF THE PREFERRED EMBODIMENTS

The invention should be made of rustproof material. The positioner should be sized according to the size of the hook being positioned. The holding strength of the positioner should be dependent on the lure size and the size of the fish being pursued, but in any case strong enough to hold the hook in position until the strike by the fish and not so strong as to prevent release of the hook after the fish is hooked.

The positioner can be attached to the lure by any convenient method such as a nail for a wooden lure, screw for a plastic lure, solder or spot weld for a metal lure and holder, or, as in the case of a plastic lure, the holder could be an integral part of the lure itself.

The positioner can be any suitable material such as plastic, rubber, or metal, but in any case should not have any sharp edges which could cut the line.

The invention is particularly effective when used with single hooks but is by no means limnited to use with single hooks.

Figure 1:
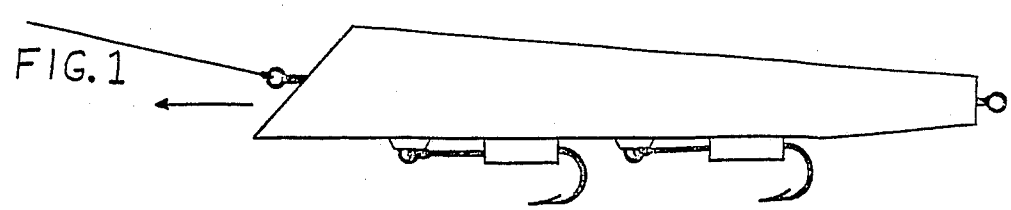
FIG. 1 shows a lure employing the invention in use with a line attached to the front of the lure and the arrow indicating the direction the lure is being pulled through the water. The hooks are in the positioners as they would be before a fish strikes the lure.

FIG. 1 shows a solid body artificial fishing lure with the preferred orientation of the hooks and hook positioner. This lure would also very likely include a rear or tail hook which is not positioned by the invention method. The lure in use would be pulled in the direction indicated by the arrow either by casting and retrieving or by trolling behind a moving boat. The hooks positioned by the invention method will be pointing in the direction of the pull and thus will be in perfect position to penetrate the mouth of the fish.

Figure 2:
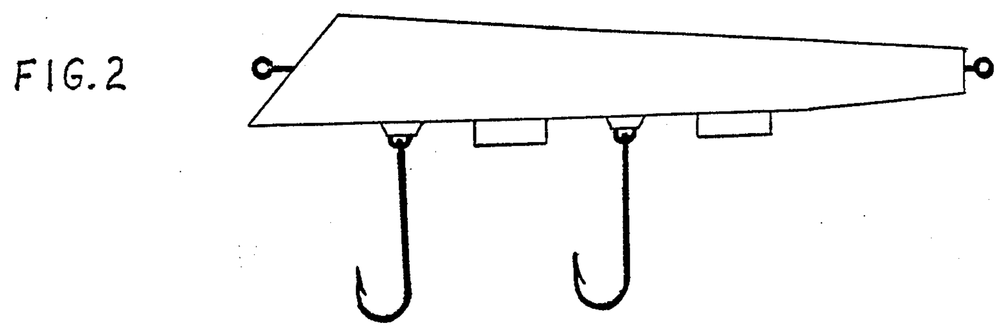
FIG. 2 shows a lure with the hooks released and pivoting freely as they would be after a fish is hooked and has pulled them from the positioners.

FIG. 2 shows the lure with the hooks in the released position able to pivot freely. If the release were not employed as part of the invention, a hooked fish could, by pulling at an angle to the direction of the retreive, use the lure for leverage to help in dislodging the hooks.

Figure 3:
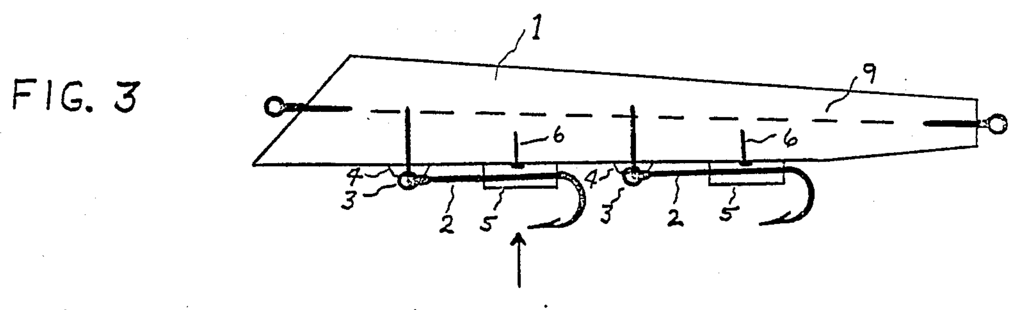
FIG. 3 shows a longitudinal section of a lure and positioners taken vertically through the axis.

FIG. 3 shows a longitudinal section of the body 1. The body 1 is a solid elongated member to which hooks 2 are attached by a conventional pivoting method, each using a screweye 3 and finish washer 4.

Figure 4:
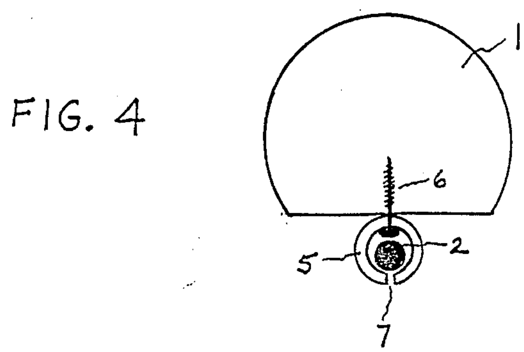
FIG. 4 shows a cross section taken at the arrow in FIG. 3.
Figure 5:
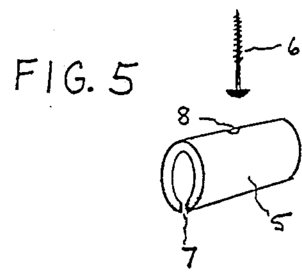
FIG. 5 shows the separate elements of the invention.

The invention consists of a piece of hollow, flexible, plastic cylinder or tube 5 and a small screw 6 for attachment of tube 5 to body 1. Tube 5 is approximately one half as long as the shank of hook 2. The diameter of tube 5 is slightly larger than the shank of hook 2 to allow room for the head of screw 6 as can be seen in FIG. 4 which is a cross section taken at the arrow in FIG. 3. Tube 5 has a hole 8 midway between the two ends to accommodate screw 6 and a single lengthwise slit 7 directly opposite the hole 8. Tube 5 is screwed to the body 1 behind hook 2 such that the length of tube 5 is parallel or nearly parallel to the longitudinal axis 9 of body 1 and is centered on the ventral surface of body 1 and such that when hook 2 is in tube 5 the rearward end of tube 5 will be near where the bend in hook 2 starts.

The hook 2 is snapped into tube 5 and the point of hook 2 is held parallel or nearly parallel to the longitudinal axis 9 of body 1. When the shank of hook 2 is in tube 5 there will be limited lateral movement of the point of hook 2. Hook 2 is positioned in perfect position for hook setting and ultimately for fish catching. The lateral force of a hooked fish will pull the hook 2 out of tube 5 and the hook will then pivot normally with relation to body 1.

This preferred method of carrying out the invention lends itself well to retrofitting existing lures to increase their productivity. The necessary parts can easily be added to many solid body lures of various sizes and types.

The heretofore mentioned method of employing the invention is by no means limiting. Many variations are possible and some variations would in fact be necessary to accommodate different lure types and materials.

Those familiar with lure design and manufacture will appreciate these variations.

I claim:

1. A fishing lure body with at least one depending hook and a slitted hollow circular hook positioner means attached to the body whereby the shank of said hook can be inserted into said positioner means so that the shank of said hook is parallel to the longitudinal axis of said lure body to limit movement of the hook and a pull of a fish can release the hook from the positioner means.

* * * * *